US011261315B1

(12) United States Patent
Hosseinnezhad Mohtarami et al.

(10) Patent No.: US 11,261,315 B1
(45) Date of Patent: Mar. 1, 2022

(54) ENVIRONMENTALLY FRIENDLY ASPHALT BINDER ADDITIVE (71) Applicant: North Carolina Agricultural and Technical State University, Greensboro, NC (US)

(72) Inventors: Shahrzad Hosseinnezhad Mohtarami, Greensboro, NC (US); SK Faisal Kabir, Greensboro, NC (US); Mahour Mellat-Parast, Greensboro, NC (US); Elham Fini, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 41 days.

(21) Appl. No.: 16/738,817

(22) Filed: Jan. 9, 2020

Related U.S. Application Data (60) Provisional application No. 62/790,411, filed on Jan. 9, 2019.

(51) Int. Cl.
*C08L 17/00* (2006.01)
*C08F 2/46* (2006.01)
*C08J 3/28* (2006.01)
*C08L 23/08* (2006.01)
*C08L 95/00* (2006.01)

(52) U.S. Cl.
CPC .......... *C08L 17/00* (2013.01); *C08J 3/28* (2013.01); *C08L 23/0853* (2013.01); *C08L 95/00* (2013.01); *C08J 2317/00* (2013.01); C08L 2555/82 (2013.01)

(58) Field of Classification Search
CPC ........ C08J 3/26; C08J 2317/00; C08L 17/00; C08L 23/0853; C08L 95/00; C08L 2555/82
See application file for complete search history.

(56) References Cited

U.S. PATENT DOCUMENTS

| 3,843,457 | A | * | 10/1974 | Grannen et al. | ........ C10B 53/00 201/2.5 |
| 5,210,982 | A | * | 5/1993 | Kormanek | ............... B24D 3/34 51/298 |
| 7,931,784 | B2 | * | 4/2011 | Medoff | ..................... C12P 7/10 204/157.63 |
| 7,932,065 | B2 | * | 4/2011 | Medoff | ................. D21C 9/007 435/165 |
| 8,236,535 | B2 | * | 8/2012 | Medoff | ..................... C12P 7/58 435/162 |
| 8,378,161 | B1 | * | 2/2013 | Hemmings | .............. C08J 11/12 585/240 |
| 8,900,360 | B2 | * | 12/2014 | Nevin | ..................... C08L 91/00 106/284.4 |
| 9,435,076 | B2 | * | 9/2016 | Medoff | ..................... C10G 32/04 |
| 9,487,708 | B2 | * | 11/2016 | Doucet | ..................... C10K 1/024 |
| 9,637,615 | B2 |   | 5/2017 | Fini | |
| 9,701,838 | B2 | * | 7/2017 | Medoff | ................. C08L 97/005 |
| 10,072,227 | B2 | * | 9/2018 | Budarin | ................... C10B 19/00 |
| 10,338,184 | B2 | * | 7/2019 | Medoff | ..................... C13K 1/02 |
| 10,662,445 | B2 | * | 5/2020 | Maiti | ................ B01D 11/0492 |
| 10,689,196 | B2 | * | 6/2020 | Medoff | ................. B65G 69/20 |
| 10,752,841 | B2 | * | 8/2020 | Alyaser | ................... C10B 33/12 |
| 2013/0237633 | A1 | * | 9/2013 | Tamir | ..................... C08L 77/00 523/129 |
| 2015/0128829 | A1 | * | 5/2015 | Huang | ................... C04B 26/26 106/273.1 |
| 2020/0263005 | A1 | * | 8/2020 | Tamir | ..................... C04B 26/26 |
| 2021/0171775 | A1 | * | 6/2021 | Le | .......................... C02F 3/342 |

OTHER PUBLICATIONS

Chunfei et al. Conventional and microwave-assisted pyrolysis of biomass under different heating rates. Journal of Analytical and Applied Pyrolysis, vol. 107, pp. 276-283. (2014) (Year: 2014).*
Fini et al. Synthesis and Characterization of Biomodified Rubber Asphalt: Sustainable Waste Management Solution for Scrap Tire and Swine Manure. Journal of Environmental Engineering. vol. 139 (12). pp. 1455-1461 (Dec. 2013). (Year: 2013).*
Tyczkowski, J., Krawczyk, I. and Woźniak, B., 2003. Modification of styrene-butadiene rubber surfaces by plasma chlorination. Surface and coatings technology, 174, pp. 849-853.
Romero-Sánchez, M.D. and Martín-Martínez, J.M., 2006. Surface modifications of vulcanized SBR rubber by treatment with atmospheric pressure plasma torch. International journal of adhesion and adhesives, 26(5), pp. 345-354.
Romero-Sanchez, M.D., Walzak, M.J., Torregrosa-Maciá, R. and Martín-Martínez, J.M., 2007. Surface modifications and adhesion of SBS rubber containing calcium carbonate filler by treatment with UV radiation. International journal of adhesion and adhesives, 27(6), pp. 434-445.
Romero-Sánchez, M.D., Pastor-Blas, M.M. and Martin-Martinez, J.M., 2003. Treatment of a styrene-butadiene-styrene rubber with corona discharge to improve the adhesion to polyurethane adhesive. International journal of adhesion and adhesives, 23(1), pp. 49-57.
Manhart, J., Kramer, R., Schaller, R., Holzner, A., Kern, W. and Schlögl, S., Jul. 2016. Surface Functionalization of Natural Rubber by UV-Induced Thiol-ene Chemistry. In Macromolecular Symposia (vol. 365, No. 1, pp. 32-39).
De Sousa, F.D., Scuracchio, C.H., Hu, G.H. and Hoppe, S., 2017. Devulcanization of waste tire rubber by microwaves. Polymer Degradation and Stability, 138, pp. 169-181.
Kwon, S.K., Ahn, J.M., Kim, G.H., Chun, C.H., Hwang, J.S. and Lee, J.H., 2002. Microwave absorbing properties of carbon black/silicone rubber blend. Polymer Engineering & Science, 42(11), pp. 2165-2171.
Perreux, L. and Loupy, A., 2001. A tentative rationalization of microwave effects in organic synthesis according to the reaction medium, and mechanistic considerations. Tetrahedron, 57(45), pp. 9199-9223.

(Continued)

Primary Examiner — Sanza L. McClendon (57) ABSTRACT

The presently disclosed subject matter generally relates to environmentally friendly asphalt binder additive.

19 Claims, 7 Drawing Sheets (56) References Cited

OTHER PUBLICATIONS

Hosseinnezhad, S., Bocoum, A., Martinez, F.M. and Fini, E.H., 2015. Biomodification of rubberized asphalt and its high temperature properties. Transportation Research Record, 2506(1), pp. 81-89.

Xiao, F., Amirkhanian, S.N., Shen, J. and Putman, B., 2009. Influences of crumb rubber size and type on reclaimed asphalt pavement (RAP) mixtures. Construction and Building Materials, 23(2), pp. 1028-1034.

\* cited by examiner

ENVIRONMENTALLY FRIENDLY ASPHALT BINDER ADDITIVE

RELATED APPLICATIONS

The presently disclosed subject matter claims the benefit of U.S. Provisional Patent Application Ser. No. 62/790,411 filed Jan. 9, 2019; the disclosure of which is incorporated herein by reference in its entirety.

STATEMENT AS TO RIGHTS TO INVENTIONS MADE UNDER FEDERALLY SPONSORED RESEARCH OR DEVELOPMENT

This invention was made with government support under Grant Number 194 awarded by the National Cooperative Highway Research Program. The government has certain rights in the invention.

TECHNICAL FIELD

The presently disclosed subject matter relates generally to asphalt sealants comprising biomodified binder in conjunction with crumb rubber and the use of such materials.

BACKGROUND

Asphalt sealants are commonly employed to address cracks in asphalt. Asphalt sealants typically comprising asphalt binder, but such use may be unsustainable due to fluctuations in availability. Crumb rubber, which is readily available and more environmentally friendly, has been incorporated with asphalt binder to form a modified asphalt sealant, and has been shown to improve asphalt binder performance and durability.

The application of crumb rubber from scrap tire in asphalt industry has been shown to extend service life, reduce noise levels, improve, thermal properties and skid resistance, as well as provide a safe method for recycling scrap tire, however, challenges associated with the workability of crumb rubber, e.g. segregation, have limited its application. Segregation is the result of a high settling rate of crumb rubber in modified asphalt. Rubber particle size, the density differences between rubber and asphalt binder, and swelling of rubber particles all contribute to segregation. The polymeric structure of rubber mostly comprises vulcanized rubber, wherein rubber molecules are crosslinked via sulfur bonds; vulcanized rubber has particular challenges regarding inadequate dispersion and incompatibility with asphalt binders. Physical techniques to modify rubber surface, including plasma polymerization, plasma chlorination, ultraviolet radiation, ozone treatment, and corona discharge have been used to try to address the crosslinking of rubber. Chemical treatments, which can help avoid the excessive disintegration of rubber structure common to physical techniques, have included derivatization with acrylic acid or bis (2-hydroxy ethylene) terephthalamide. However, use of crumb rubber has specific challenges, including, but not limited to: reduced workability associated with large size of swollen rubber particles; lack of compatibility with asphalt matrix which promotes segregation; and difficulty in pumping.

Accordingly there is a need for a composition that includes asphalt binder and crumb rubber that does not suffer from these limitations.

SUMMARY

In some embodiments, the presently disclosed subject matter provides a composition comprising crumb rubber and biomodified binder. In some embodiments, the presently disclosed subject matter provides a method for preparation of a composition comprising crumb rubber and biomodified binder, optionally further comprising asphalt binder. In some embodiments, the presently disclosed subject matter provides a method of using the composition in the sealing of cracks in asphalt.

The presently disclosed subject matter provides, in one aspect, a method of preparing an environmentally friendly asphalt binder additive, the method comprising (a) providing a biomodified binder derived from swine waste; (b) combining the biomodified binder with crumb rubber for at least about one hour; and (c) exposing the crumb rubber to microwave irradiation.

The presently disclosed subject matter provides, in another aspect, an environmentally friendly asphalt binder additive comprising a biomodified binder derived from swine waste; and crumb rubber, wherein the crumb rubber or the additive has been exposed to microwave radiation. In one embodiment, the crumb rubber has been exposed to microwave radiation; alternately, the additive has been exposed to microwave radiation.

The presently disclosed subject matter provides, in yet another aspect, environmentally friendly asphalt binder additive comprising (a) a biomodified binder derived from swine waste; and (b) crumb rubber, wherein the additive has been exposed to microwave radiation, and the surface of the crumb rubber is chemically modified by the biomodified binder.

BRIEF DESCRIPTION OF THE DRAWINGS

It will be understood that the drawings are for the purpose of describing embodiments of the inventions and are not intended to limit the inventions thereto.

DETAILED DESCRIPTION

This description is not intended to be a detailed catalogue of all the ways in which the present invention may be implemented or of all the features that may be added to the present invention. For example, features illustrated with respect to one embodiment may be incorporated into other embodiments, and features illustrated with respect to a particular embodiment may be deleted from that embodiment. Thus, one or more of the method steps included in a particular method described herein may, in other embodiments, be omitted and/or performed independently. In addition, numerous variations and additions to the embodiments suggested herein, which do not depart from the instant invention, will be apparent to those skilled in the art in light of the instant disclosure, Hence, the following description is intended to illustrate some particular embodiments of the invention, and not to exhaustively specify all permutations, combinations and variations thereof. It should therefore be appreciated that the present invention is not limited to the particular embodiments set forth herein. Rather, these particular embodiments are provided so that this disclosure will more clearly convey the full scope of the invention to those skilled in the art.

The terminology used herein is for the purpose of describing particular embodiments of the present invention only and is not intended to limit the present invention. Although the following terms are believed to be well understood by one of skill in the art, the following definitions are set forth to facilitate understanding of the presently disclosed subject matter.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. References to techniques employed herein are intended to refer to the techniques as commonly understood in the art, including variations on those techniques or substitutions of equivalent techniques that would be apparent to one of skill in the art.

Following long-standing patent law convention, the terms "a" "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is, inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it, limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed subject matter can include the use of either of the other two terms.

As used herein, the term "about", when referring to a value is meant to encompass variations of in one example ±20% or ±10%, in another example in, another example ±1%, and in, still another example ±0.1% from the specified amount, as such variations are appropriate to perform the disclosed methods.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10", "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The present application is generally directed to a sustainable sealant with crumb rubber treated with microwave radiation and biomodified binder.

Conditioning crumb rubber with biomodified binder and exposing the conditioned rubber particles to microwave radiation permits interaction of polar molecules in biomodified binder with the microwave radiation, producing internal heating and providing enough energy to break the vulcanized crosslinking bonds within the rubber. This interaction can lead to a de-vulcanized structure of crumb rubber. Cleavage of sulfur bonds and interaction with polar molecules of biomodified binder results in producing sulfhydryl group leading to surface modified rubber by releasing some short polymeric chain. The results are distribution of de-vulcanized polymer chains inside the biomodified binder, and producing a composite of biomodified binder and crumb rubber with elastomeric behavior.

The presently disclosed subject matter provides, in one aspect, a method of preparing an environmentally friendly asphalt binder additive, the method comprising (a) providing a biomodified binder derived from swine waste; (b) combining the biomodified binder with crumb rubber for at least about one hour; and (c) exposing the crumb rubber to microwave irradiation. In one embodiment, step c of the method of preparation follows step b; alternately, step b follows step c.

The presently disclosed subject matter provides, in another aspect, an environmentally friendly asphalt binder additive comprising a biomodified binder derived from swine waste; and crumb rubber, wherein the crumb rubber or the additive has been exposed to microwave radiation. In one embodiment, the crumb rubber has been exposed to microwave radiation; alternately, the additive has been exposed to microwave radiation.

The presently disclosed subject matter provides, in another aspect, environmentally friendly asphalt binder additive comprising (a) a biomodified binder derived from swine waste; and (b) crumb rubber, wherein the additive has been exposed to microwave radiation, and the surface of the crumb rubber is chemically modified by the biomodified binder.

In one variation of any aspect or embodiment, the crumb rubber is immersed in biomodified binder for between about 1 and about 48 hours; alternately, the crumb rubber is immersed in biomodified binder for between about 1 and about 24 hours or between about 1 and about 12 hours, or at least about 1 hour, at least about 2 hours, at least about 3 hours, at least about 4 hours, at least about 5 hours or at least about 6 hours. In one variation, the crumb rubber is combined with the biomodified binder for at least about 4 hours and then the reaction mixture is exposed to microwave radiation for at least about 1 minute, at least about 2 minutes, at least about 3 minutes, at least about 4 minutes, at least about 5 minutes, at least about 6 minutes, at least about 7 minutes, at least about 8 minutes, at least about 9 minutes, or at least about 10 minutes. As would be familiar to one of skill in the art, the length of time of irradiation appropriate to achieve the results disclosed herein is dependent on the power of the microwave, which can vary.

In one variation of any aspect or embodiment, the additive further comprises a bituminous binder, such as is PG 64-22, PG 52-28, PG 52-34 or combinations thereof; alternately, the bituminous binder is PG64-22. In another variation, the additive further comprises a polymer, in one embodiment, the polymer is an elastomeric or a plastomeric polymer. In another embodiment, the elastomeric polymer is styrene-butadiene-styrene, styrene-isoprene-styrene or combinations thereof. In yet another embodiment, the plastomeric polymer is polyethylene, polypropylene, ethylene vinyl acetate copolymer, or combinations thereof; alternately, the plastomeric polymer is ethylene vinyl acetate.

In one variation of any aspect or embodiment, the biomodified binder has a pH of between about 5 and 6.5, a density between about 0.80 g/mL and 1.25 g/mL, and a viscosity between about 0.05 Pa·s and about 0.15 Pa·s at 60° C. In another embodiment, the biomodified binder has a pH of between 5.75 and 6.25, a density of between 0.90 g/mL and 1.05 g/mL, and a viscosity between about 0.05 Pa·s and about 0.1 Pa·s at 60° C.

In one variation of any aspect or embodiment, the crumb rubber is combined with the biomodified binder at a ratio of between about 1:0.25 and about 1:20, between about 1:0.5 and about 1:10, or between about 1:1 and 1:5. In one variation of any aspect or embodiment, the crumb rubber has a mesh size between about 200 and 18, or between about 140 and 50, alternately, the crumb rubber has a mesh size between 80 and 200.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from, the scope of the presently disclosed subject matter.

Example 1

Preparation of Biomodified Binder

Biomodified binder was prepared according to the methods generally described in U.S. Pat. No. 9,637,615 and in Fini, E. H., Al-Qadi, I. L., You, Z., Zada, B., & Mills-Beale, J. (2012). "Partial replacement of asphalt binder with bio-binder: characterisation and modification." *International Journal of Pavement Engineering,* 13(6), 515-522.

Generally, swine manure from the farm of North Carolina A&T State University was filtered and maintained at 20% moisture and, charged into an autoclave reactor. Nitrogen gas was used, to purge the residual air in the reactor three times. The reactor as then heated to 305° C. at pressure of 10.3 MPa for 80 min. After the reaction was completed, the reactor was rapidly cooled down to room temperature and the gas then released from the reactor. The aqueous side products and biochar were then removed from the biomodified biobinder, which characterized in Table 1 and used in the following syntheses.

TABLE 1

|  | pH | Density (g/mL) | Elemental Analysis (wt %) | | | | | Ash content (wt %) | Viscosity (Pa · s) at 60° C. |
|---|---|---|---|---|---|---|---|---|---|
|  |  |  | C | H | N | O | S |  |  |
| Bio-modified biobinder | 5.97 | 0.96 | 63.44 | 8.36 | 3.53 | 14.04 | 0.29 | 10.34 | 0.075 |

Preparation of CRM

Crumb rubber (CR, (80 mesh, 60 gram), Liberty Tire Recycling) was immersed in biomodified binder in the ratio of 1:1 for 12 hours, yielding an unactivated biomodified crumb rubber (CRM).

Preparation of M-CR

Crumb rubber (CR, (80 mesh, 60 gram), Liberty Tire Recycling) was treated in a microwave oven (2,450 MHz) with microwave power of 400 W and radiation duration of 4 min, yielding microwave-treated crumb rubber (M-CR).

Preparation of SAR

Crumb rubber was treated with hybrid treatment of biochemical and microwave radiation. Crumb rubber particles were immersed in biomodified binder in the ratio of 1:1 for 12 hours, then exposed to microwave irradiation (2,450 MHz, power of 400 W) for 4 minutes, yielding a microwave-treated biomodified crumb rubber (SAR).

Preparation of Rubber-Modified Asphalt Binders

To produce various rubber-modified asphalt binders, 15% (activated or non-activated) rubber particles (CR (unactivated crumb rubber), M-CR (microwave-treated crumb rubber), SAR (microwave-treated bio-modified crumb rubber)) by weight of base binder were individually introduced and blended into asphalt binder (PG 64-22). The blending of various rubber particles into asphalt binder was done using a bench-top shear mixer at 3000 rpm at 180° C. The crumb rubber was gradually poured into the binder while the shearing was continuously applied for 30 min, following the California Department of Transportation specification. The shearing speed was maintained constant and the mixing blade was completely submerged into the sample, to prevent whipping of air into the asphalt. The asphalt binders are referred herein to their rubber-based components: (CR (unactivated crumb rubber asphalt binder), M-CR (microwave-treated crumb rubber asphalt binder), SAR (microwave-treated bio-modified crumb rubber asphalt binder)).

Preparation of Eco-Seal Samples

Crumb rubber was treated with hybrid treatment of biochemical and microwave radiation. Crumb rubber particles were immersed in biomodified binder in the ratio of 1:3, 1:4 or 1:5 for 12 hours, then exposed to microwave irradiation (2,450 MHz, power of 400 W) for 4 minutes, yielding microwave-treated biomodified crumb rubbers of various ratios.

The microwave-treated biomodified crumb rubbers of various ratios were then individually introduced and blended into asphalt binder (PG 64-22) as disclosed above to yield "1:3 Eco-Seal" "1:4 Eco-Seal" and "1:5 Eco-Seal."

Characterization Methods

FTIR-ATR Analysis

A Thermo Scientific Nicolet iS10 FT-IR Spectrometer was used in absorbance mode to acquire the FTIR-ATR spectra of CR, M-CR, and SAR rubber samples from wavenumbers 4000 $cm^{-1}$ to 400 $cm^{-1}$. The background spectrum was taken after cleaning the diamond prism with methylene chloride.

Viscosity

To study the effect of modification on the rheological properties of asphalt, binders, the viscosity of each modified asphalt sample was measured using a Brookfield viscometer DVII-Ultra, following the ASTMD4402 specification (ASTM-D4402, 2015), Viscosity was measured by applying continuous shear using a smooth spindle (SC4-27) for 15 min, Measurements were done at four different temperatures (105° C. 120° C., 135° C., 150° C.), and shearing speed of 20 rpm.

Rheological Characterization—Dynamic Shear Rheometer (DSR)

A Thermo Scientific HAAKE rheometer from 70° C. to 22° C. was used to evaluate the elastic and viscous behavior through monitoring the shear stress and shear strain due to application of a specified oscillation rate (10 rad/s), typically used to represent the shearing action caused by a traffic speed of 90 km/h (AASHTO-T315, 2012). The measured data was then used to calculate the complex shear modulus (G*) and phase angle (6). In addition, the rutting performance of the binder was evaluated using the method of multiple stress creep recovery (MSCR), as outlined in the AASHTO standard (AASHTO-T315, 2012);

Segregation Test

Figure 4:
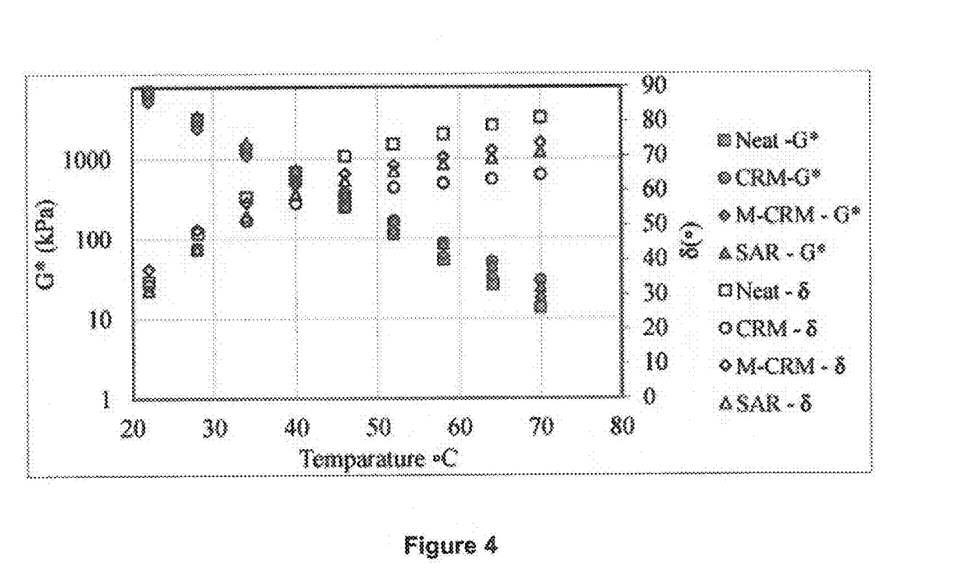
FIG. 4 is a graph of temperature dependency of the complex modulus (G*) and phase angle (δ) for activated and non-activated rubber-modified asphalt binders; (neat asphalt binder, conventional crumb rubber modified asphalt binder (CRM), microwave-activated crumb rubber modified asphalt binder (M-CRM) and surface activated rubber modified asphalt binder (SAR).

The Cigar Tube Test (ASTM D7173-14) was used to examine extent of segregation of activated and non-activated rubber particles within the asphalt matrix. A segregation index was calculated for each by comparing complex modulus and phase angle of top and bottom sections of each sample; results are shown in FIG. 4.

To conduct the test, samples were heated to 163° C. until they were sufficiently fluid to pour in aluminum tubes, which were then placed vertically in a sample holder rack. Tube tops were sealed to prevent air intrusion. Tubes were then placed inside an oven at 163° C. for 48 h. After 48 h, the rack was put in a freezer for 4 h at −18° C. After cooling the tubes were taken out and cut into three equal sections. The middle part was discarded, and bottom and top sections were stored for tests with dynamic shear rheometer at 58° C. The data from the test was used to calculate complex modulus and phase angle which were further use to obtain the segregation index (SI) according to Equation (2) below.

$$SI = \frac{\left(\frac{G^*}{\sin\delta}\right)max - \left(\frac{G^*}{\sin\delta}\right)avg}{\left(\frac{G^*}{\sin\delta}\right)_{avg}} \quad (2)$$

Fracture Energy Analysis

Figure 3:
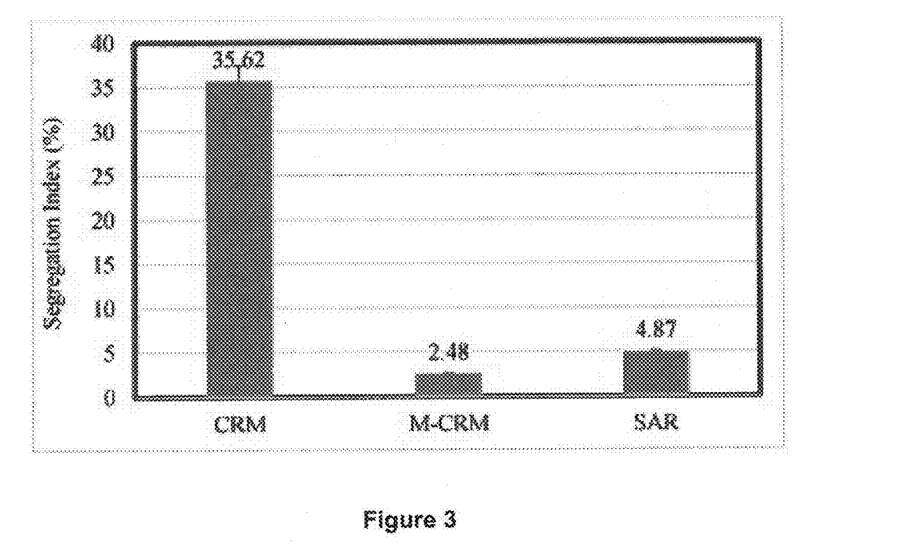
FIG. 3 is a bar graph of segregation indices (%) for activated and non-activated rubber-modified asphalt binders: (conventional crumb rubber modified asphalt binder (CRM), microwave-activated crumb rubber modified asphalt binder (M-CRM) and surface activated rubber modified asphalt binder (SAR).

A Direct Tension Test (DTT) was performed following (ASTM D6723-12) to analyze low temperature performance of non-activated rubber (i.e. CRM) as well as activated rubber M-CRM, SAR); results are shown in FIG. 3.

The apparatus manufactured by Interlaken Inc. applies tensile forces to dog-bone-shaped asphalt binder specimens. To prepare a sample, the binder is heated until it is flowable, then it is poured into DTT molds and cooled down to room temperature. Samples are then placed in a freezer for 7 min before demolding. After demolding, the samples are placed in the DTT methanol bath at −12° C. and held for 1 h before running the test. The data collected from the test is used, to calculate fracture energy (Equation (1)):

$$\text{Fracture Energy} = \frac{\sum \text{Area}_{L-D,Curve}}{\text{Area}_{C,S,A}}$$

where $\text{Area}_{L-D\ curve}$ is the area under the Load-Displacement Curve (in Nm)
$\text{Area}_{C.S.A}$ is the cross-section area at fracture (in m²)

Scanning Electron Microscopy (SEM)

SEM samples were sputter coated with 3 nm AuPd with a Leica EM ACE200 coating system and imaged with a Zeiss Auriga field emission scanning electron microscope (FESEM) operating at 5 kV accelerating voltage.

Direct Adhesion Test

The Direct Adhesion Test (AASHTO T 370) was used to determine the adhesion strength of hot-poured asphalt crack sealant at the application temperature. The adhesion test is a test of fracture and the objective of the test is to apply tensile forces to the interface between sealant and aluminum end pieces. Typically, the sealant is confined between two half cylindrical aluminum end pieces. The applied force and displacement are recorded as functions of time. The energy required to break the bond can be calculated by measuring the area under the load displacement curve. This energy can be considered a measure of bonding. The maximum force to failure is generally reported as "adhesion strength."

Multiple Stress Creep Recovery (MSCR) Test

The Multiple Stress Creep Recovery (MSCR) Test (AASHTO TP70) was performed on each Eco-Seal samples (1:3, 1:4 and 1:5) as well as commercial sealants (Type 4, AR+Type 2, AR341 and B195) as comparisons.

Results and Discussion—Crumb Rubbers and Asphalt Binders Comprising Same

Chemical Analysis

FTIR spectra of activated and non-activated rubber (FIG. 1) showed a significant reduction in the intensity of peak at 710 cm⁻¹ and at 870 cm⁻¹ which correspond to CC and CH bonds of the main rubber chain in both M-CR and SAR compared to CRM, generally attributed to the breakage of polymeric chains due to the structural modifications. The peak at 1540 cm⁻¹ is associated to the stretching frequency of methyl assisted conjugated double bonds [ν-[CH═CH]$_n$]— where n>6, which appears in spectra of vulcanized naturel rubber (one of the constituent of crumb rubber) but is not observed after modification. The disappearance of this peak for M-CR and SAR is evidence of devulcanization and reducing conjugated double bonds in the crumb rubber.

Figure 1:
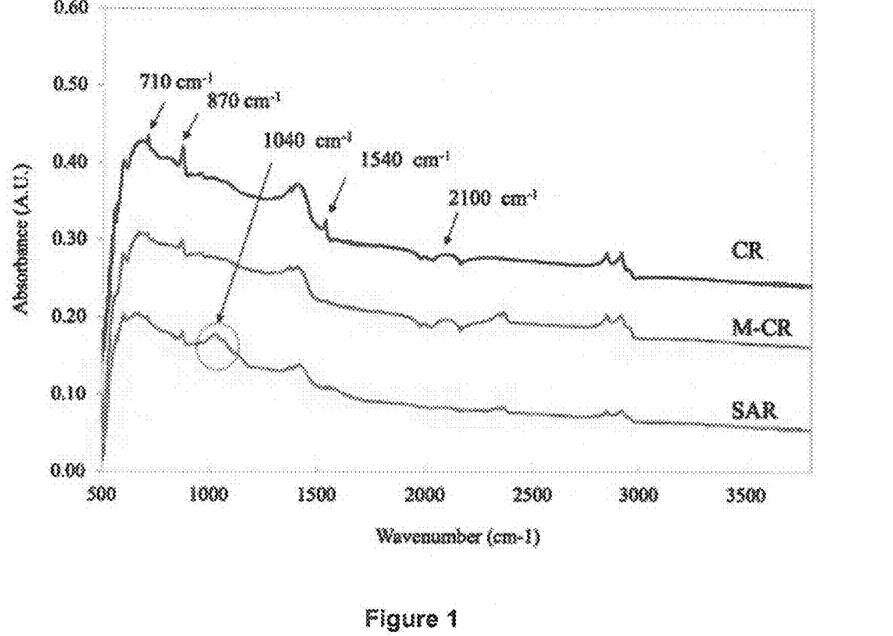
FIG. 1 is a Fourier-Transform Infrared spectrum for activated and non-activated rubber products (crumb rubber (CR), microwave-activated crumb rubber (M-CR) and surface activated rubber (SAR)).

The SAR sample spectrum showed a reduction in the intensity of a broad peak at 2100 cm⁻¹ corresponding to stretching frequency of isothiocyanate —N═C═S, while a new peak at 1040 cm⁻¹ can be attributed to the formation of a C—N amine group resulting from the interaction of bio-modifier and crumb rubber in SAR.

Density Function Theory Analysis

To examine underlying interaction mechanisms occurring during production of SAR via the hybrid modification, a computational approach using Density Function Theory was employed. The analysis accounts for the hybrid modifications of both microwave irradiation and chemical reaction. Microwave devulcanization may break the cross-links of sulfur-sulfur and carbon-sulfur bonds to create active sites, for subsequent reactions. The bio-modifier of the present, application is a nitrogen-rich product that includes traces of oxime (—C═N—O), amine (R—N—R'R") and amide (CO—NRR') functional groups, such as tetradecanal o-methyloxime, benzo[c]cinnolin-4-amine N,N-dimethyl, hexadecanamide, and n-butyl octadecanamide.

Interaction of the amide functional groups with broken chains of the polymer-containing carbon radicals or monovalent/divalent sulfur radicals may explain interaction between the rubber component and the biomodifier components. Based on the calculations, the reaction is not thermodynamically stable as shown below.

ΔE=+23.06 kcal/mol

Although there is no indication of H-atom transfer from amide molecule or formation of amidyl radical through this reaction coordinate, the electromagnetic field of microwave irradiation has a potential to dissociate NH bond and create amidyl and other radicals from the bio-modifier.

The amidyl radical may interact with sulfur- and carbon-centered radicals. While the amide-head groups are involved in one side, long tails of the amide molecules available in the bio-modifier, such as hexadecanamide, and n-butyl octadecanamide, have the potential to link to the polymer chain through attractive dispersion forces between carbon chains in two fragments. In this way, the amide molecules may act as a cross-linking agent to provide a continuous and more stable polymer network.

Property Characterization

Figure 2:
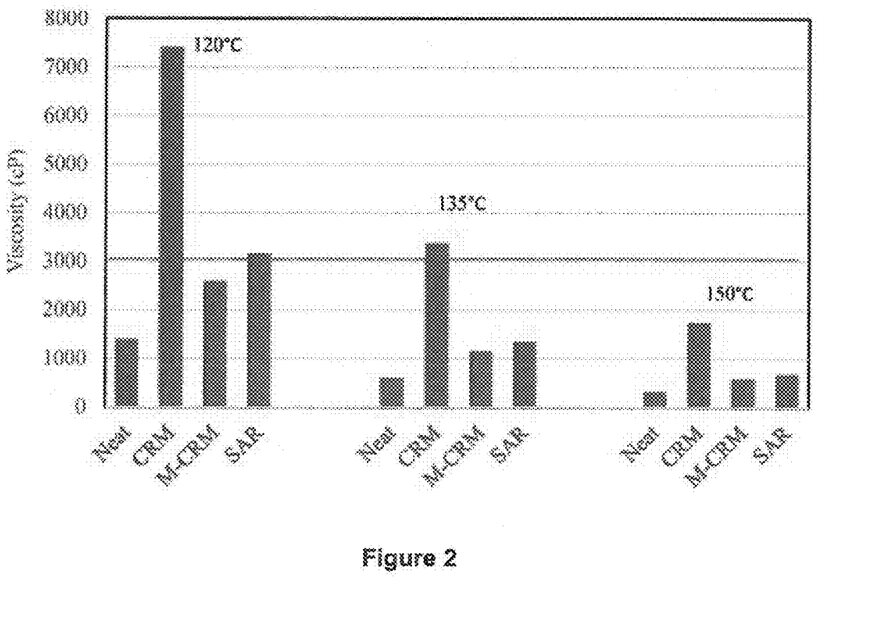
FIG. 2 is a bar graph of viscosity (in cP) of activated and non-activated rubber-modified asphalt binders (neat asphalt binder, conventional crumb rubber modified asphalt binder (CRM), microwave-activated crumb rubber modified asphalt binder (M-CRM) and surface activated rubber modified asphalt binder (SAR) at 120° C., 135° C., and 150° C.

The viscosity results of SAR, M-CRM, CRM and neat binder at 120° C., 135° C., and 150° C. (FIG. 2) show a substantial reduction in viscosity in activated rubbers compared to non-activated scenarios in all measured temperatures. The observed reduction in the viscosity of the activated rubbers, which may be attributed to breakage of crosslinks and disulfide bonds, correlates to improved workability of crumb-rubber-modified asphalt after surface activation. Among activated scenarios, SAR showed higher viscosity than the M-CRM binder, which may be related to the role of polar groups of biomolecules grafted onto the rubber surface. Increased surface polarity in SAR can promote the formation of a network among rubber particles and asphalt molecules increasing overall viscosity of SAR compared to that of M-CRM.

The segregation index (SI) value of the activated binders are significantly lower than non-activated binder (FIG. 3), suggesting the treatment approach improved compatibility of rubber and asphalt matrix. Both modified products (M-CRM and SAR) have lower SI value, with SAR having 86.33% and M-CRM having 93% lower segregation than the non-activated product. Physisorption of bio-modifier onto the surface of the rubber via Van der Waals forces may be enhanced by microwave irradiation giving rise to covalent bond formation and grafting bio-molecules onto the rubber surface.

The complex modulus (G*) and phase angle (δ) for temperatures ranging from 22° C. to 70° C. for all rubber modified asphalt binders were measured (FIG. 4). The G* values of CRM and SAR are the same from 22° C. to 64° C., but beyond that CRM has a higher modulus than SAR. In the temperature range of 22° C.-34° C., CRM and SAR have the same trend in phase angle value, but above 34° C., δ does not change much as evidenced by a plateau for CRM, while for SAR, the rate of change in δ is higher. Through the measured temperatures of 22° C.-70° C., M-CRM shows lower G* and higher phase angle value than SAR and CRM. A high asphalt complex modulus together with a low phase angle makes the asphalt pavement more resistant to rutting. As a result, SAR and CRM have both higher rutting resistance than M-CRM, while SAR has better workability and storage stability than CRM.

Figure 5A:
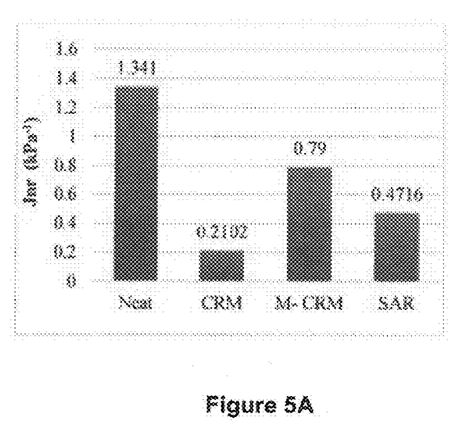
FIG. 5A is a bar graph of non-recoverable creep compliance, Jnr (in $kPa^{-1}$) for activated and non-activated rubber measured at 58° C.
Figure 5B:
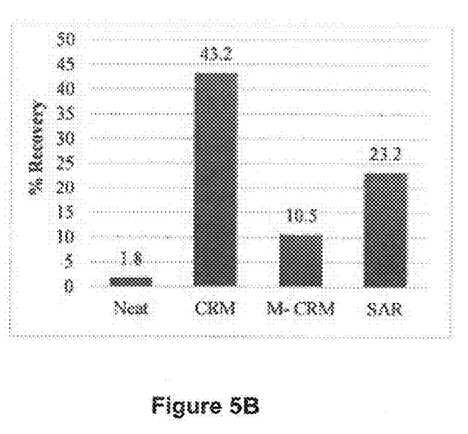
FIG. 5B is a bar graph of the percent, of recoverable strain for activated, and non-activated rubber measured at 58° C.: (neat asphalt binder, conventional crumb rubber modified asphalt binder (CRM), microwave-activated crumb rubber modified asphalt binder (M-CRM) and surface activated rubber modified asphalt binder (SAR)

The percent recovery and Jnr values measured through MSCR test for activated and non-activated rubber asphalt binders were measured at 3.2 kPa load and 58° C. (FIG. 5). Among the three modified asphalt binders, CRM had the highest percent recovery, perhaps due to the intact structure of the rubber particle. Among the activated rubber asphalt binders, SAR had a significantly higher percent recovery than M-CRM consistent with a more elastic behavior, which can be attributed to the presence of biomolecules, which consumes the energy of irradiation to create radicals and leading to the formation of new bonds. Reallocation of the energy of irradiation to bond formation would reduce the extent of disintegration of rubber bulk structure in SAR compared to M-CRM. The lower Jnr value indicates the resistance to rutting and it was shown between activated rubbers, SAR has the lowest value and higher resistance to rutting.

Figure 6:
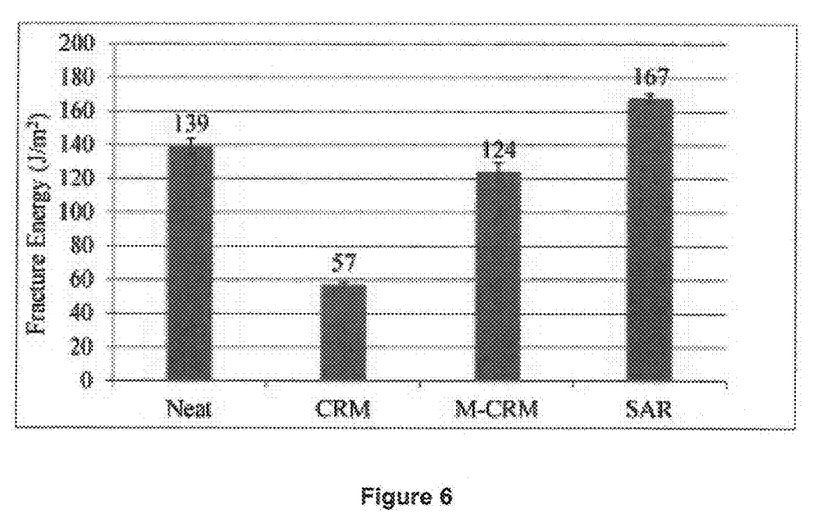
FIG. 6 is a bar graph of the fracture energy (in J/m2) at −12° C. for activated and non-activated rubber-modified asphalt binders: (neat asphalt binder, conventional crumb rubber modified asphalt binder (CRM), microwave-activated crumb rubber modified asphalt binder (M-CRM) and surface activated rubber modified asphalt binder (SAR).

Fracture energy and susceptibility of each specimen due to low-temperature cracking was evaluated using the direct tension test (DTT) at −12° C. (FIG. 6). CRM had a lower fracture energy than both activated rubber binders perhaps due to reduced strain at failure. In the case of activated rubber binders, fracture energy of SAR found to be 34.68% more than that of M-CRM, which may be due to the interaction between the molecules of bio-modifier such as hexadecanamide, and n-butyl octadecanamide, wherein one side is involved with carbon centered radicals of rubber, and the long tails of these molecules can interact with asphalt molecules mainly through attractive-dispersion forces between carbon chains of fragments. Formation of such secondary network could enhance the performance of asphalt containing surface activated rubber as evidenced in fracture energy of SAR being 34.6% higher than M-CRM.

Figure 7:
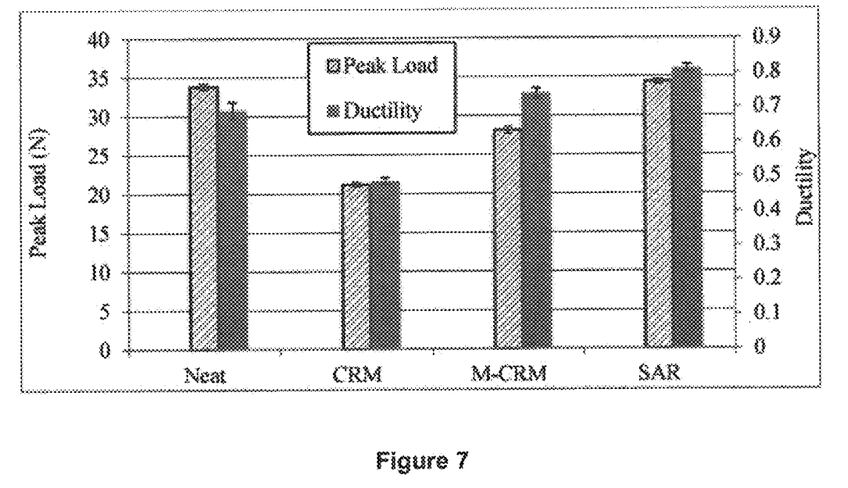
FIG. 7 is a bar graph of Peak Load (in N) and Ductility at −12° C. for activated and non-activated rubber-modified asphalt binders: (neat asphalt binder, conventional crumb rubber modified asphalt binder (CRM), microwave-activated crumb rubber modified asphalt binder (M-CRM) and surface activated rubber modified asphalt binder (SAR).

The fracture energy in terms of peak loads and ductility were also measured as described herein (FIG. 7) for the asphalt binder samples. The SAR peak load and strain at failure are 22% and 9.59% more than M-CRM. The latter improvements can be attributed to the formation of the secondary network in SAR mainly due to successful grafting of bio-molecules to rubber surface and interaction between activated rubber particles and binder structure.

Morphological Studies

Scanning electron microscopy images (SEM) of activated and non-activated rubber differentiated samples as well as bio-modification. The surface roughness of microwave untreated rubber (CR) appeared significantly reduced after microwave treatment, which could be due to the degradation of rubber. The rubber sample treated with bio-modifier showed the presence of new features after microwave irradiation, attributed to grafting bio-molecules onto the rubber surface.

The observed differences in surface features of M-CRM and SAR in the SEM were reflected in reduced segregation index and enhanced fracture energy of SAR compared with M-CRM, SAR showed 86% reduction in segregation index compared to the other CRM scenarios. Such enhancement was also reflected in a significant improvement in workability of SAR modified binder compared to the other CRM scenarios. Mechanical tests showed high fracture energy (167 J/m2) for SAR modified asphalt, which was approximately three times higher than that of conventional CRM asphalt (57 J/m$^2$).

Conclusion—Crumb Rubbers and Asphalt Binders Comprising Same

As has been demonstrated herein, sustainable surface-activated rubber particles have been introduced into an asphalt matrix, thereby alleviating issues associated with rubber segregation and workability. Partial devulcanization via irradiation is complemented by chemical grafting via bio-modification. In particular, crumb rubber particles were surface activated via hybrid processing involving microwave irradiation and bio-modification to produce surface activated rubber, which was then introduced to the asphalt binder.

FTIR analysis indicated the breakage of polymer chains of rubber due to irradiation as well as subsequent crosslinking due to bio-modification. The latter was evidenced in the appearance of a new peak at 1040 cm$^{-1}$ of the FTIR spectra for SAR indicating the formation of C—N group from an amine resulting from the interaction of bio-modifier and crumb rubber. DFT modeling was consistent with a possible mechanism for breakage of N—H bond in bio-molecules followed by formation of C—N bond. Viscosity values showed a reduction of 59.95% from the viscosity value of CRM indicating an improvement in workability of asphalt containing SAR. In addition, the segregation index of SAR showed to be 86.33% lower than CRM. The reduction of segregation may be due to enhanced interaction between rubber and asphalt matrix resulting from chemical grafting via bio-modification, which promotes the formation of a secondary network within the asphalt-rubber matrix preventing segregation. Asphalt containing SAR had a 121% higher percent recovery than M-CRM and the fracture energy of asphalt containing SAR (167 J/m$^2$) was nearly three times higher than that of non-activated rubber (57 J/m$^2$). Further analysis of the fracture energy in terms of peak loads and ductility showed M-CRM and SAR having 33% and 62.62% higher peak load than CRM, respectively. The strain at failure for M-CRM and SAR were found to be 52.12% and 66.71% higher than CRM.

As shown herein, hybrid processing involving microwave irradiation and bio-modification to produce a sustainable surface activated rubber alleviated both segregation and workability issues associated with the use of crumb rubber in asphalt while improving its thermo-mechanical properties.

Results and Discussion Eco-Seal

Figure 8:
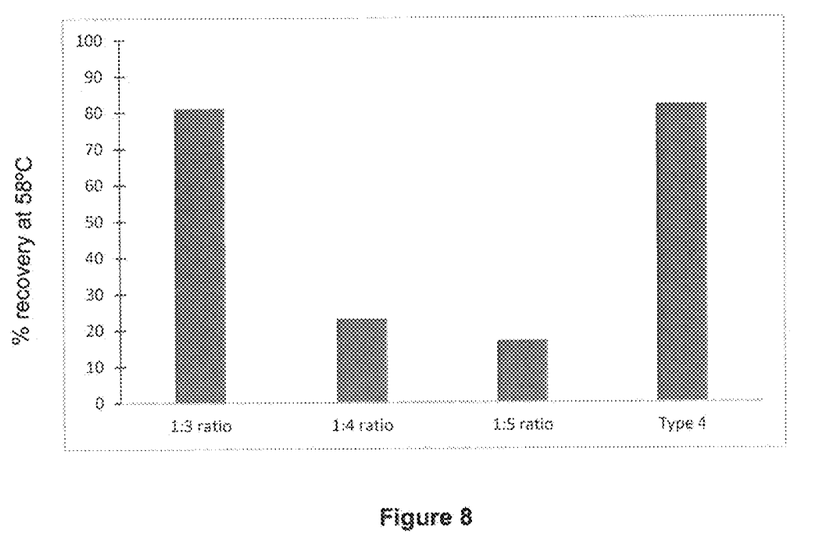
FIG. 8 is a bar graph showing the percent recovery at 58° C. of Eco-Seal samples of varying ratios (1:3, 1:4 and 1:5) compared to commercial Sealant Type 4.

Results (FIG. 8) showed that Eco-Seal with ratio of 1:3 had highest percent recoverable strain, equivalent to the commercial sealant Type 4. "1:3 Eco-Seal" was chosen for additional rheological studies.

Figure 9A:
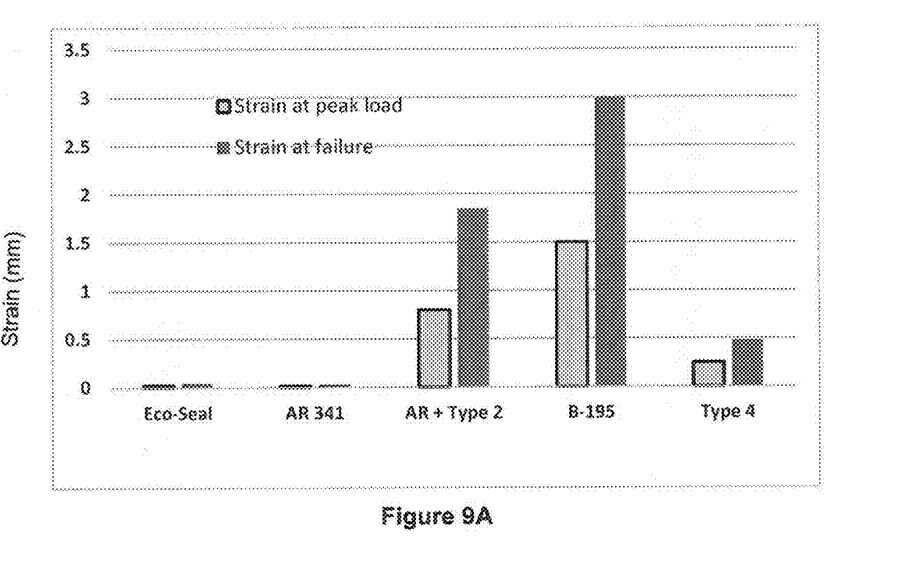
FIG. 9A is a bar graph comparing the Strain (in mm) at Peak Load and at Failure for Eco-Seal of the present application to commercial sealants AR 341, AR+Type 2, 8-195 and Type 4.
Figure 9B:
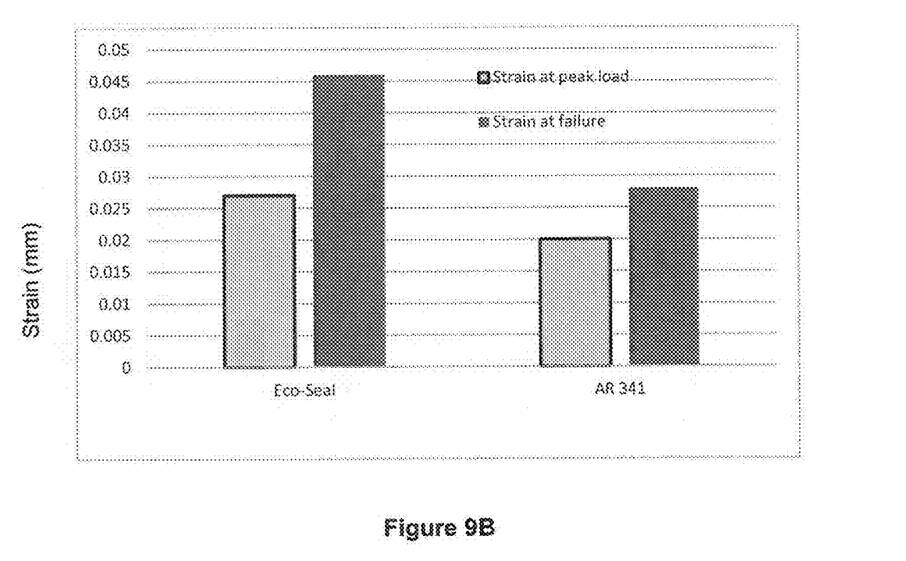
FIG. 9B is a blow-up of FIG. 9A, comparing the Strain (in mm) at Peak Load and at Failure for Eco-Seal and AR341.
Figure 9C:
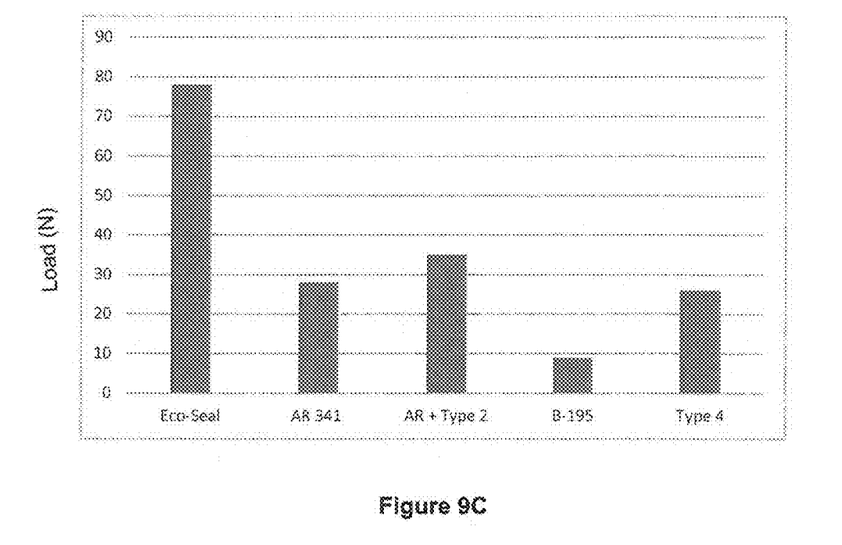
FIG. 9C is a bar graph comparing the Load (in N) for Eco-Seal of the present application to commercial sealants AR 341, AR+Type 2, B-195 and Type 4.

The properties of commercial sealants, AR+Type 2, AR341 and B-195, were compared to 1:3 Eco-Seal. As shown in FIGS. 9A and 9B, the strain accumulated at peak load and failure in Eco-Seal is higher than the AR341. The failure strain accumulation of 1:3 Eco-Seal is 73% higher than sealant AR341. In terms of peak load (FIG. 9C), 1:3 Eco-Seal carried the highest load but was found to be brittle.

Figure 10A:
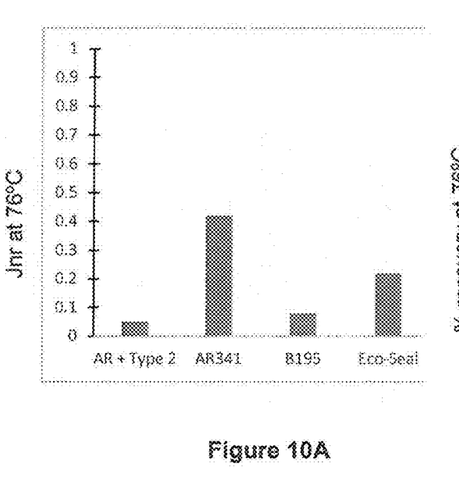
FIG. 10A is a bar graph comparing Jnr (in kPa) of Eco-Seal of the present application to commercial sealants AR+Type 2, AR 341, and B-195.
Figure 10B:
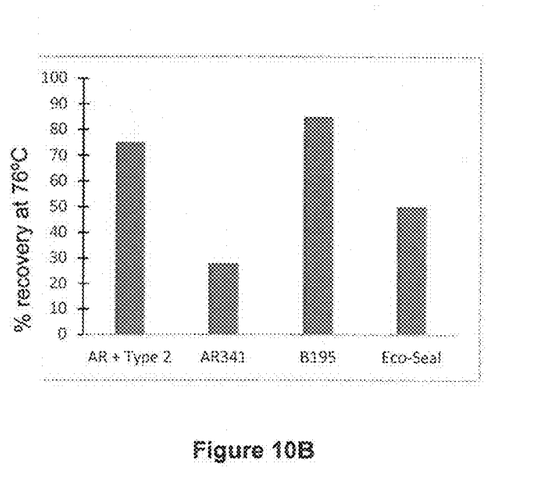
FIG. 10B is a bar graph comparing percent recovery at 78° C. of Eco-Seal of the present application to commercial sealants AR+Type 2, AR 341, and 8-195.

A Multiple Stress Creep Recovery (MSCR) Test (AASHTO TP70) was performed on different commercial sealants including 1:3 Eco-Seal of the present application. Results of Jnr and percent recoverable strain are shown in FIGS. 10A and 10B. The commercial benchmark, AR341, had a higher Jnr value (0.434) than Eco-Seal (0.225) at 76° C. The lower the Jnr value the better the rutting resistance, suggesting 1:3 Eco-Seal has better rutting resistance. Eco-Seal also had a higher percentage recovery at 76° C. (almost 50%) than AR341, demonstrating 1:3 Eco-Seal's use in improving crack resistance in asphalt.

Figure 11A:
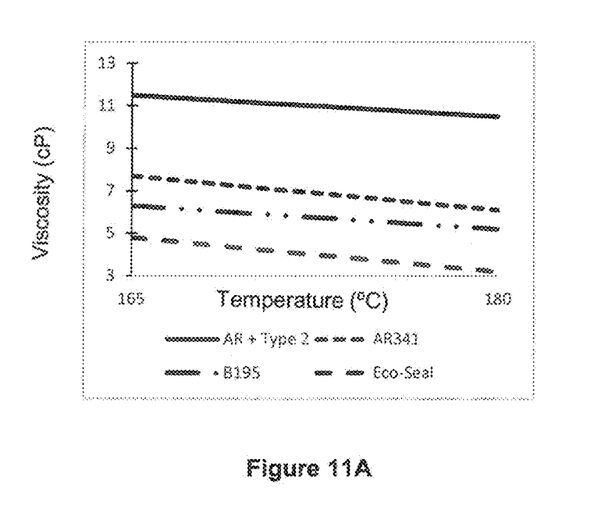
FIG. 11A is a graph comparing viscosity (in cP) as a function of temperature (° C.) of Eco-Seal of the present application to commercial sealants AR+Type 2, AR 341, and B-195.
Figure 11B:
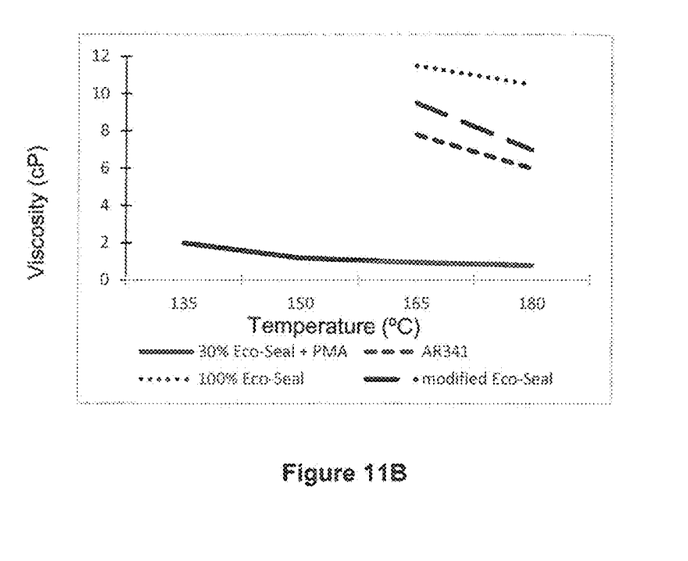
FIG. 11B is a bar graph comparing viscosity (in cP) as a function of temperature of 30% Eco-Seal PMA, 100% Eco-Seal and modified Eco-Seal to commercial sealant AR 341.

As shown in FIG. 11A, Eco-Seal viscosity was fairly high at each of 165° C. and 180° C. compared to the identified commercial sealants. The addition of a polymer modified asphalt (PMA) comprised of 7% EVA (ethylene vinyl acetate)+PG 64-22 reduced the viscosity, wherein the Modified Eco-Seal recipe was (55% 1:3 Eco-Seal+45% PMA). Specifically the Modified Eco-Seal demonstrated viscosity reduced by 37.66% compared to the 1:3 Eco-Seal original formulation (FIG. 11B). The preparation of another variation of Eco-Seal comprising 30% 1:3 Eco-Seal+70% PMA lowered the viscosity notably even at 135° C.

Conclusion Eco-Seal

Most asphalt sealants rely on polymers and a bituminous matrix and therefore have higher production cost due to the need to add high cost polymers (e.g. polyStyrene-polyButadiene-polyStyrene (SBS) type or Styrene Butadiene Rubber (SBR)). As shown herein, the disclosed method produce a low cost, green sealant using waste rubber optionally in combination with microwave treatment and replacing a portion of the petroleum-based matrix with sustainable biomodified binder. The chemical structure of biomodified binder enables reaction with the surface of crumb rubber under microwave radiation leading to a sealant with enhanced rheological properties.

As shown herein, activating crumb rubber using a combination of a bio-modified binder and microwave radiation improves the rheological properties of the asphalt composition.

It will be understood that various details of the presently disclosed subject matter may be changed without departing from the scope of the presently disclosed subject matter. Furthermore, the foregoing description is for the purpose of illustration only, and not for the purpose of limitation,

The invention claimed is:

1. A method of preparing an environmentally friendly asphalt binder additive, the method comprising:
    (a) providing a biomodified binder derived from swine waste;
    (b) combining said biomodified binder with crumb rubber for at least about one hour;
    (c) exposing the crumb rubber to microwave irradiation.

2. The method of claim 1, wherein said biomodified binder has a pH of between about 5 and 6.5, a density between about 0.80 g/mL and 1.25 g/mL, and a viscosity between about 0.05 Pa·s and about 0.15 Pa·s at 60° C.

3. The method of claim 2, wherein said biomodified binder has a pH of between 5.75 and 6.25, a density of between 0.90 g/mL and 1.05 g/mL, and a viscosity between about 0.05 Pa s and about 0.1 Pa s at 60° C.

4. The method of claim 1 wherein step c follows step b.

5. The method of claim 1, wherein step b follows step c.

6. The method of claim 1, wherein said crumb rubber is immersed in biomodified binder for between about 1 and about 48 hours.

7. The method of claim 1, wherein said crumb rubber is combined with said biomodified binder at a ratio of between about 1:0.5 and about 1:10.

8. The method of claim 7, wherein said ratio is between about 1:1 and 1:5.

9. The method of claim 1, wherein said crumb rubber has a mesh size between about 140 and 18.

10. An environmentally friendly asphalt binder additive comprising
    (a) a biomodified binder derived from swine waste; and
    (b) crumb rubber,
wherein said crumb rubber or said additive has been exposed to microwave radiation.

11. The asphalt binder additive of claim 10, wherein said crumb rubber has been exposed to microwave radiation.

12. The asphalt binder additive of claim 10, wherein said additive has been exposed to microwave radiation.

13. The asphalt binder additive of claim 10, further comprising a bituminous binder.

14. The asphalt binder additive of claim 10, further comprising an elastomeric or plastomeric polymer.

15. The asphalt binder additive of claim 14, wherein the elastomeric polymer is styrene-butadiene-styrene, styrene-isoprene-styrene or combinations thereof.

16. The asphalt binder additive of claim 14, wherein the plastomeric polymer is polyethylene, polypropylene, ethylene vinyl acetate copolymer, or combinations thereof.

17. The asphalt binder additive of claim 14, wherein the plastomeric polymer is ethylene vinyl acetate.

18. An environmentally friendly asphalt binder additive comprising
    (a) a biomodified binder derived from swine waste; and
    (b) crumb rubber,
wherein said additive has been exposed to microwave radiation, and the surface of said crumb rubber is chemically modified by said biomodified binder.

19. The asphalt binder additive of claim 18, wherein the ratio of said crumb rubber to said biomodified binder is between about 1:1 and 1:5.

* * * * *